E. A. SPERRY.
COMBUSTION ENGINE.
APPLICATION FILED JAN. 18, 1905. RENEWED MAY 6, 1915.
1,226,132.
Patented May 15, 1917.
6 SHEETS—SHEET 6.
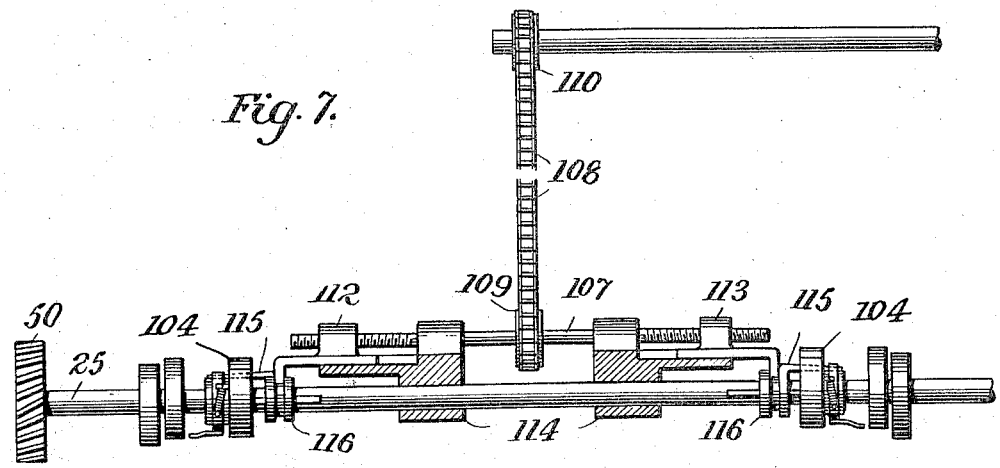
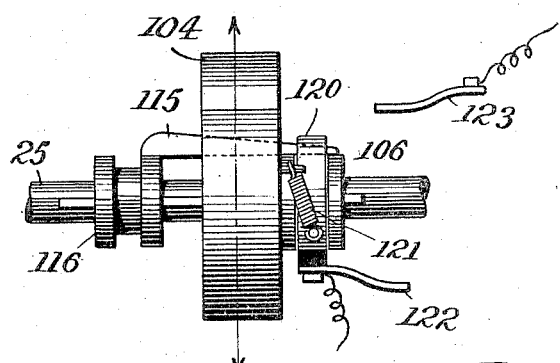
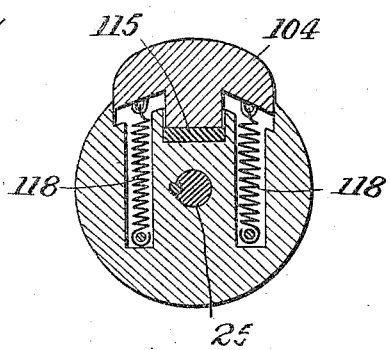
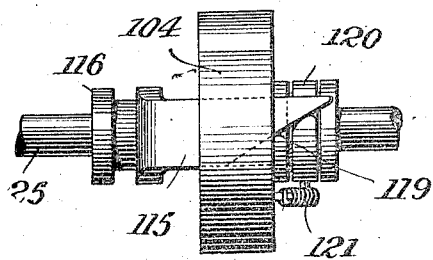

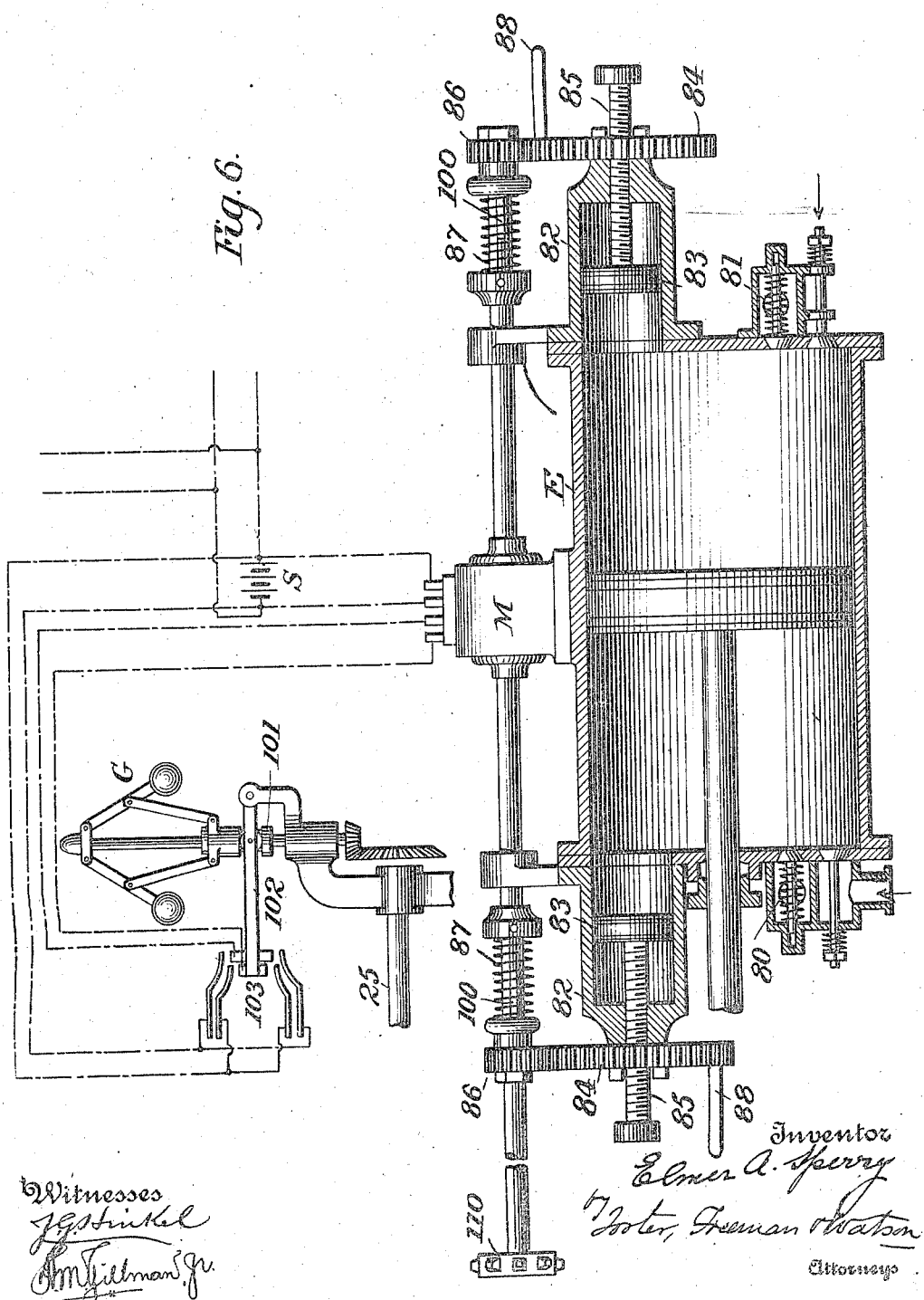

UNITED STATES PATENT OFFICE.

ELMER A. SPERRY, OF BROOKLYN, NEW YORK.

COMBUSTION-ENGINE.

1,226,132. Specification of Letters Patent. Patented May 15, 1917.

Application filed January 18, 1905, Serial No. 241,680. Renewed May 6, 1915. Serial No. 26,424.

*To all whom it may concern:*

Be it known that I, ELMER A. SPERRY, a citizen of the United States, residing at 100 Marlborough road, Brooklyn, in the county of Kings and State of New York, have invented new and useful Improvements in Combustion-Engines, of which the following is a specification.

This invention relates to compound combustion engines operating preferably upon the pre-compression four-stroke cycle described in my previous application for Letters Patent No. 454,752, December 10, 1892, and wherein after the combustion stroke of the high-pressure cylinder or cylinders the gases are admitted to a low-pressure cylinder of large area, which then takes up the further expansion of the gases and carries the same down preferably to or near the atmospheric pressure; and my invention consists in certain improvements fully set forth hereinafter and which may be carried out in various forms of apparatus, one of which is illustrated in the accompanying drawing, in which—

Fig. 6 is a longitudinal section of the pump illustrating diagrammatically the governing system;

Fig. 7 is a detached view of part of the governing apparatus;

Figure 1:
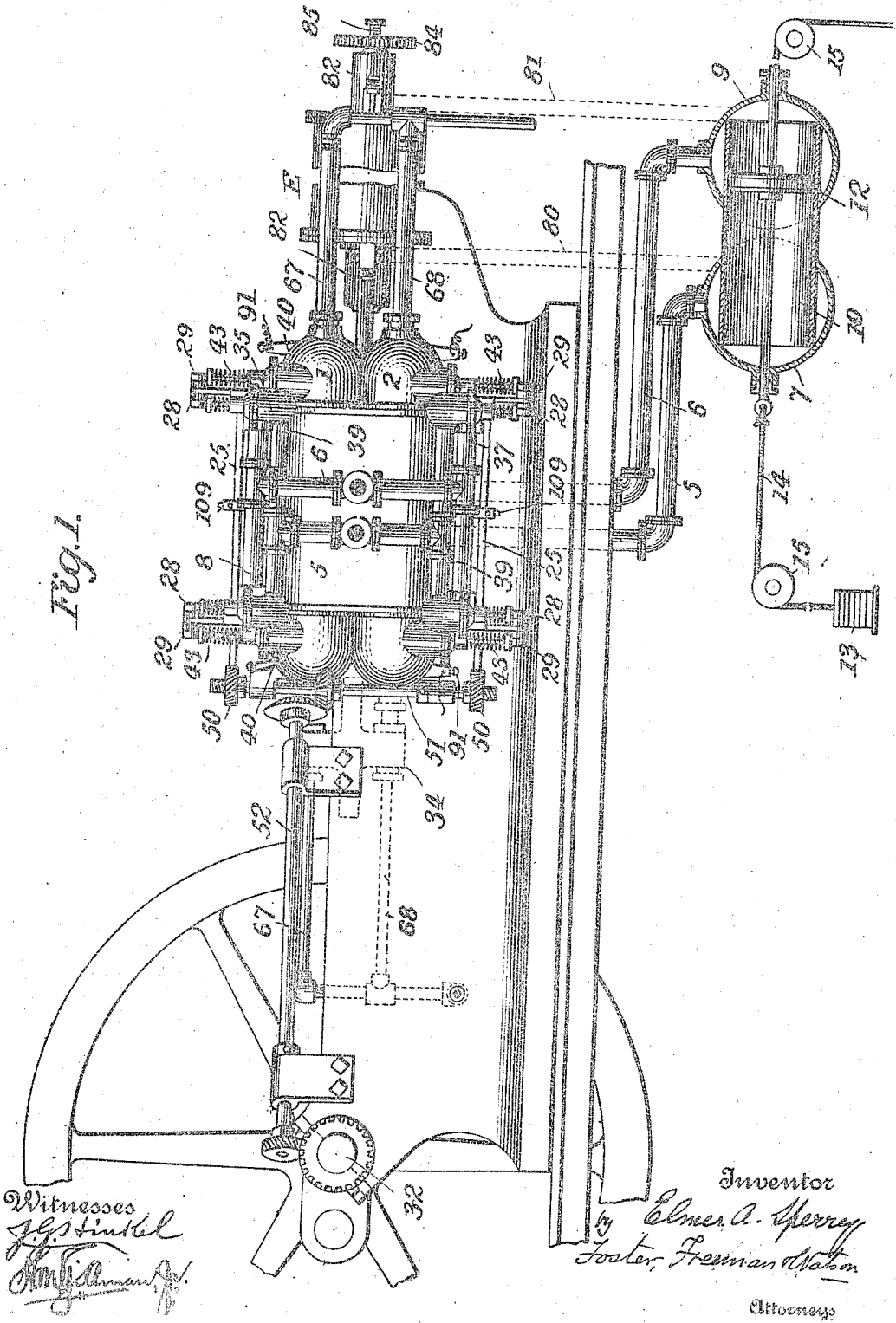
Figure 1 is a side elevation in part section of a four-cycle compound combustion engine embodying my improvements.
Figure 2:
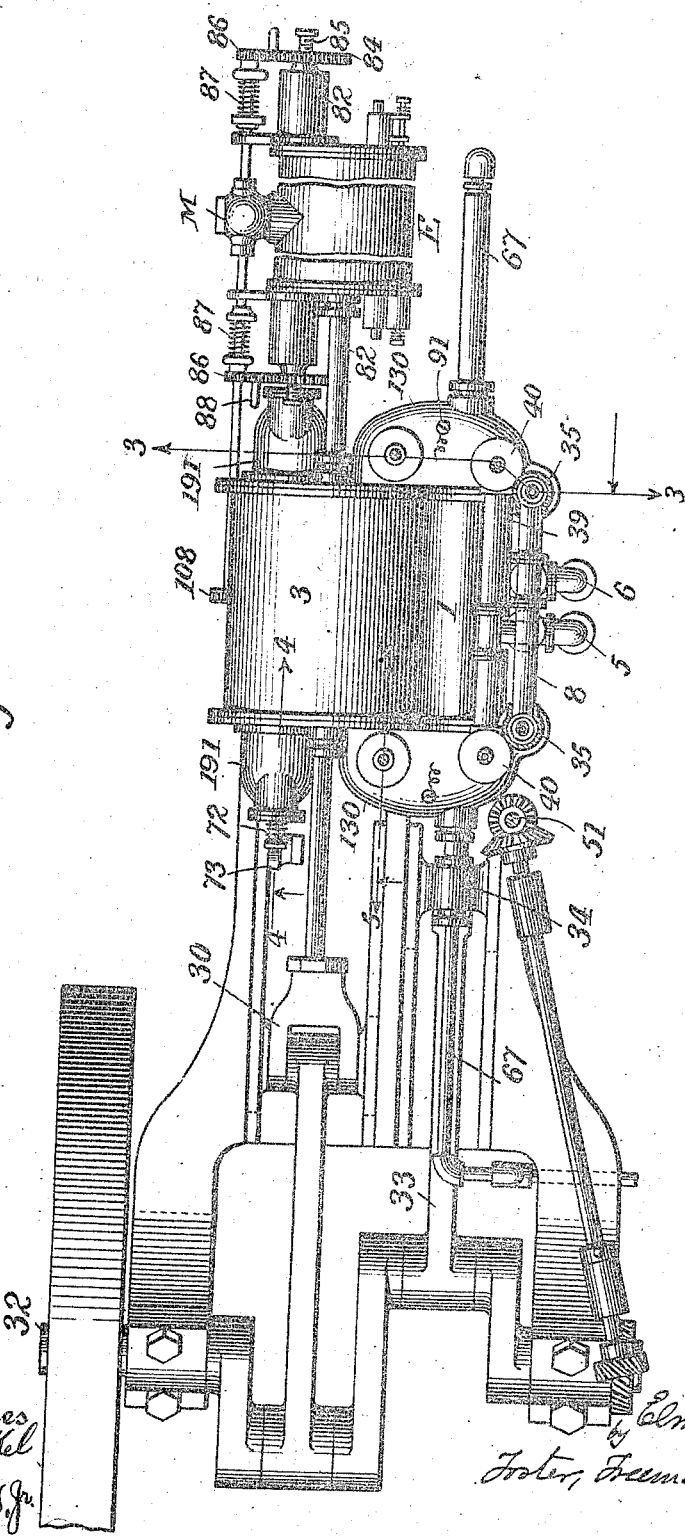
Fig. 2 is a plan view.

Figs. 8, 9, and 10 are details of construction of parts shown in Fig. 7.

Before describing the principal operations of my apparatus, I will first refer to the construction shown in the drawings, in which the engine has two high-pressure cylinders 1, 2, and a large low-pressure cylinder 3, the piston of the latter connected to a crosshead 30, from which a connecting rod extends to one of the cranks of the crank shaft 32, while the other crank, at 180 degrees from the first, is connected by a connecting rod 33 with a cross head 34 to which both of the piston rods of the high-pressure cylinders are connected.

The engine, as a whole, has its cylinders double-acting, there being four combustion chambers, four transfer valves, and properly speaking, two low-pressure chambers all within a single casting, or forming one structure from suitable parts.

Beneath the floor of the engine house, or otherwise suitably situated, is a gas reservoir 9, from which a pipe 6 extends to a cross pipe 8 communicating with the casing 35 of a gas inlet or induction valve 36 at each end of the cylinder 1, and a cross pipe 37, also communicating with the pipe 6, extends to the induction gas valve casing 35 at each end of the cylinder 2.

An air reservoir 7 adjacent to the gas reservoir 9 communicates through a pipe 5 with two cross pipes 39, each of which communicates at each end with a valve casing 40 of an induction valve 41 at each end of each of the high-pressure cylinders, a port 42 affording a communication between each casing 35 and the adjacent casing 40. Each of the aforesaid valves has a stem extending outwardly and provided with a head against which bears a spring 43 which tends to keep the valve upon its seat, and with these valves are arranged any suitable appliance whereby they may be opened at proper times as hereinafter described. As shown, there is combined with the valves of each of the high-pressure cylinders 1 and 2, a shaft 25 carrying cams which operate upon levers 26 and 27 connected by links with levers 28 and 29 that bear upon the stems respectively of the valves 36 and 41.

Each cam shaft 25 derives its rotation through spiral gears 50 from a shaft 51 driven from a shaft 52, which derives its motion from a crank shaft. The transfer valve 20 for controlling the port 60 from each high-pressure cylinder to the low-pressure cylinder is a double-seated duplicate valve, preferably hollow, with a hollow stem to and from which water flows by means of conductors 61, 62, springs 63 closing the valve to its seat, and levers 64, operated by cams on the cam shafts 25 serving to lift the valves at suitable intervals. The stem 200 of said valve 20 slides in a removable guiding cap 201 located on side of the larger of the two valve seats so that on removal of the cap the entire valve may be taken out for inspection. The high-pressure pistons and rods are also hollow and supplied with water through telescopic water connections 67, 68 extending through the cross-head 34 and supplied from a common source in any suitable manner.

It is important that the low-pressure cylinder should have an extremely low clearance, and to this end the faces of the piston are supplied with plugs 70 which extend into the ports 60, being slotted to receive the stems of the valves 20 and thereby almost completely filling the said ports.

Figure 3:
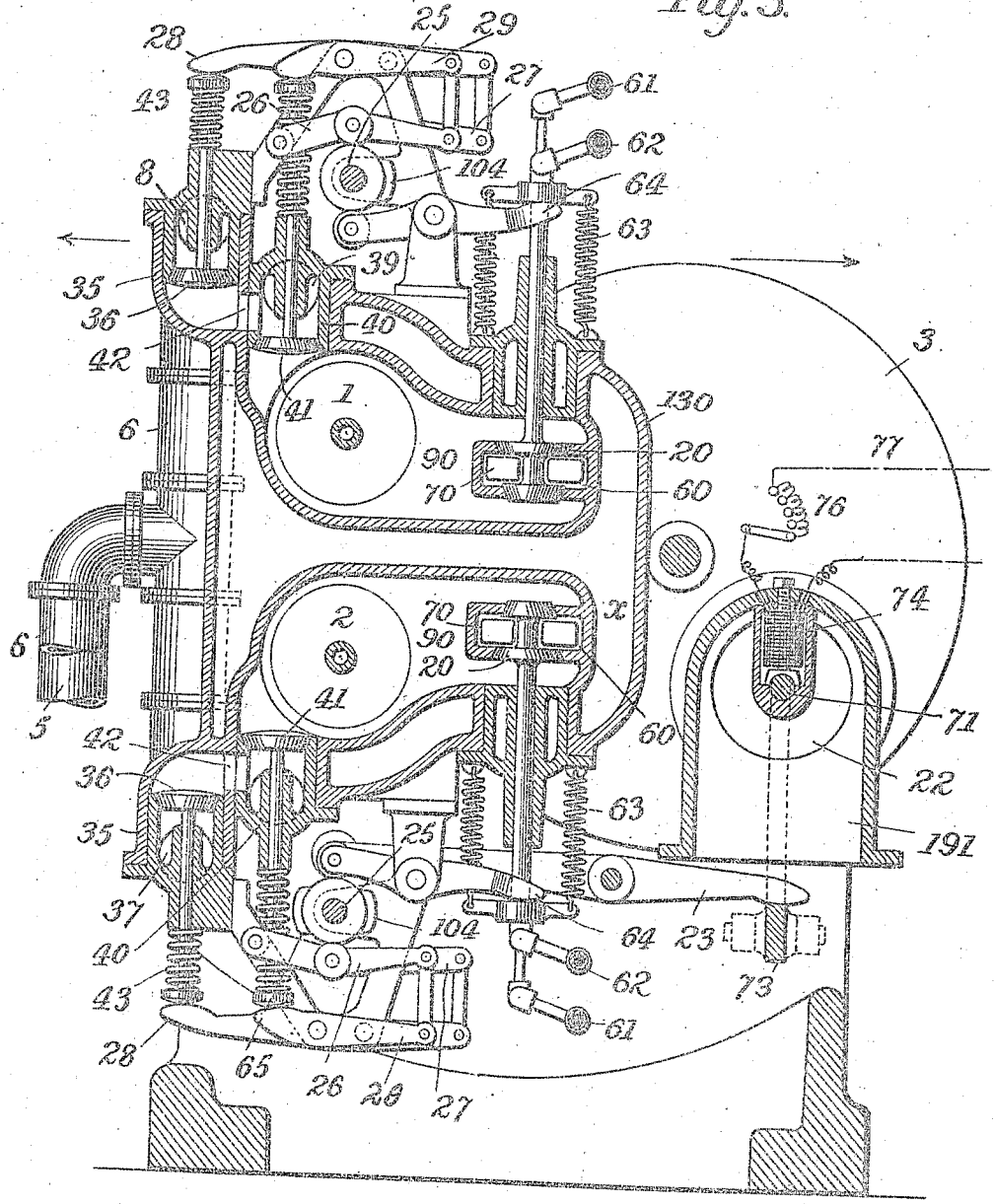
Fig. 3 is an enlarged section on the line 3—3, Fig. 2, looking in the direction of the arrow.
Figure 4:
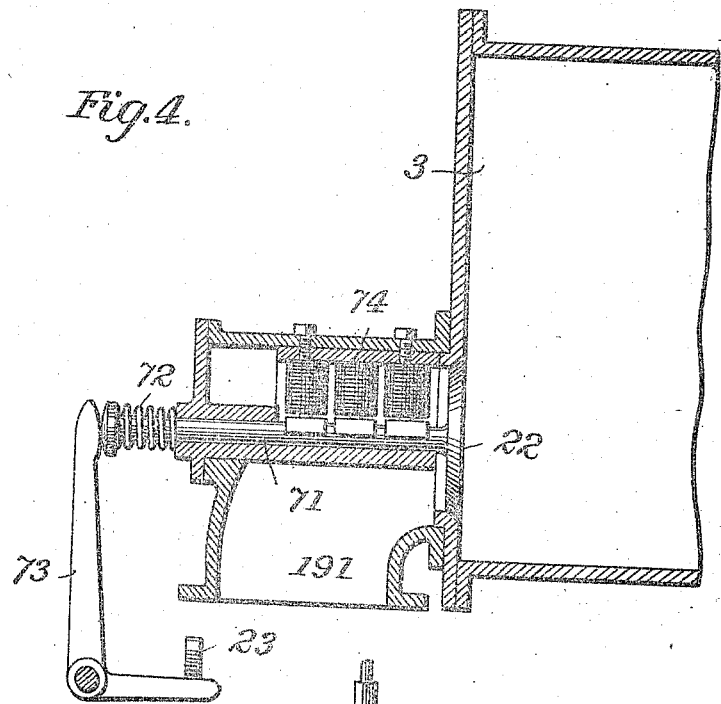
Fig. 4 is a section on the line 4—4, Fig. 2, looking in the direction of the arrow.

The low-pressure exhaust valve 22 has a horizontal stem 71 with a head against which bears a spring 72 tending to keep the valve to its seat, and a bell crank lever 73 bears upon this head and is operated by the cam 65 on the lower cam shaft 25 through the medium of a lever 23. This valve is magnetically floated, that is, a series of magnets, preferably electro-magnets 74 have their poles above the stem of the valve in such a manner as to counterbalance as nearly as possible the weight of the valve and prevent the irregular wearing of the valve and seat at the lower edges, which would otherwise occur, thereby insuring as uniform a wearing of the valve and seat as in the case of a horizontal valve with a vertical stem. Means for adjusting the magnets 74 to bring about this result is shown in the rheostat 76, Fig. 3, suitably connected in an electric circuit 77 with an electrical supply source.

The reservoirs 7 and 9 are preferably long hollow cylinders and communicate at some point between their ends through the medium of cross pipe or cylinder 10 within which floats a piston 12 for determining the relative pressures within the cylinders, by weighting the said piston in one direction or the other. Thus, as shown, the piston rod extends through packing boxes in the cylinders in both directions and is adapted for connection at either or each end with a cable 14 passing over a guide pulley 15 and provided with a suitable number of weights 13.

When it is desired to run the air at a higher pressure than the gas, the weight is attached to the end of the piston so as to carry the latter toward the air reservoir, and when it is desired that the gas shall be at a higher pressure than the air, the weight is transferred to the opposite end of the piston rod. It will be evident that other means may be employed for securing a preponderance of pressure in one reservoir or the other, as for instance, a pump supplying both reservoirs through conduits provided with a weighted valve.

The pump E supplies the two reservoirs through suitable conduits 80, 81, one end of the pump cylinder receiving gas and the other air, and the piston discharging the same as it moves in alternate directions to the respective reservoirs, suitable valves being arranged as shown in Fig. 6, and it will be seen that the air and the gaseous fuel are pumped and stored and delivered separately from each other, so that there is no combustible mixture present in the apparatus until the moment when the two gases are brought together at the induction valve or valves.

The gas and air pump may be rendered adjustable as to the amount of fluid displaced, and therefore the amount fed to the system, in an suitable manner. In the present instance it has a variable clearance at each end, that is, the cubical contents of the clearance space existing when the piston is at the end of its stroke may be varied. One means of securing this result is a reservoir 82 at each end of the cylinder of the pump, which reservoir contains a piston 83 adjustable by means of a toothed nut 84 turning on the threaded stem 85 of the piston, so that the dimensions of the chamber may be reduced, even to a negligible quantity, by carrying the piston inward, and increased by carrying it outward. As one means of simultaneously varying the dimensions of these chambers, I make use of an electric motor M, preferably a reversible motor, the armature shaft of which carries pinions 86 gearing with the toothed or gear nuts 84, and to allow for the independent setting of either piston, the pinions 86 are fitted to splines 100, or angular parts of the shaft, so as to turn therewith but slide thereon, whereby either may be moved inward and disconnected from the gear nuts 84 to permit the latter to be turned to set the piston in any desired position, after which the pinion 86 is again brought into gear with the gear nut, being maintained in place by a spring 87. The gear nuts are provided with handles 88 by means of which they may be turned by hand. As the motor runs in one direction, the gears and screws operate to reduce the adjustable clearance by forcing the pistons inward, and when the motor is caused to run in the opposite direction, the reverse effect is produced by an opposite movement of the pistons. A controller of any well known construction is one means that may be employed for reversing the motor.

Thus, as the control of an engine of this character is a comparatively simple matter, a number of different methods may be employed to this end. As one method for automatic control or governing for constant speed, I have illustrated a centrifugal speed-responsive governor G, Fig. 6, driven from any rotating part, as the extremity of one of the cam shafts 25. As the balls move in response to variations of speed, they raise and lower the sleeve 101 and lever 102, which operates the current reversing contacts or equivalent device 103, causing the motor M to run in opposite directions, or to be brought to rest when the device 103 is open circuited and the lever 102 is in its mid position.

A reversible movement of great power is thus secured under sensitive and perfect control, either automatic or otherwise, which is readily available for any and all purposes relative to the proper manipulation of the engine parts to secure the desired result.

In Figs. 7 to 10 are shown the variable lift cam 104 upon the cam shaft 25 and also one form of an igniter timing device 106 for the electric or other ignition system of the engine. The screw shaft 107 is coupled with the shaft of motor M so as to rotate therewith by any suitable means, as for instance, a chain 108 and sprockets 109, 110. As the screw shaft 107 revolves, its oppositely threaded ends cause opposite corresponding longitudinal movements of nuts 112, 113, on guides 114, with the connected parts, such as wedges 115 on the collars 116 which slide on the shaft 25. The wedges 115 perform two functions, first that of raising and lowering the cam lug 104 against the action of springs 118; and second, by altering the timing of the spark by means of a lateral inclined face 119 on each wedge shown in Fig. 10, which serves to change the lead of the loose collar 120, by coöperating with a projection or the like on said collar and turning the collar against the action of the spring 121 forming a part of the spark-timing device referred to. The ring 120 times the ignition spark or flash in any suitable manner, as for instance by coöperating electrical contacts 122 and 123, the former moving with the ring 120 and the latter stationary, both these contacts being provided with suitable electrical connection to the ignition system of the engine, preferably deriving its energy from a single source S which may be of any suitable character or construction, such as a battery, generator, supply mains, &c.

It will be readily understood that the lead or advancement of the spark, especially for constant speed, should be adjustable to meet the variations in richness of fuel or mixtures or the quantity used by the engine and which may become desirable from any conditions connected with the pre-compression or double expansion of the gases, &c. One means for varying the richness of the mixture or quantity used is shown in the variable lift cam 104 which may be used to control the gas valve or valves 36 or the mixing valve or valves 41, as will be readily understood.

In the construction above described, it will be seen that the air and the gas are supplied at a suitable pre-compression pressure to the inhalation stroke of the four-cycle operation. After the reception of the mixture at one end of each of the high-pressure cylinders, as the piston moves from that end, the valves close; as the piston moves back, effecting the compression of the charge, it is then exploded in the chamber 90, Fig. 3, by means of a suitable electric exploder 91, preferably deriving energy from the same source S as the magnets 74 and other parts, and the high pressure stroke follows. The return stroke after the high pressure is the exhaust stroke of the cycle, which is a four stroke one, and is here utilized as the transfer stroke to the low pressure cylinder during the period when it is delivering its power stroke, the transfer valve 20 remaining open during this stroke. As a result, the low pressure cylinder begins its power stroke at about the terminal pressure of the gases at the end of the power stroke within the high pressure cylinder, so that there is a relatively high pressure during the power stroke of the high pressure piston and a gradual reduction of pressure in the low pressure cylinder from the termination of this stroke within the high pressure cylinder, which falls to atmosphere by the time the low pressure piston reaches the end of its power stroke. The relative arrangement of the two high pressure cylinders is such that each piston moves or operates on the crank shaft 360° behind the other. Thus it will be seen that one transfer valve 20 is held open during one power stroke of the low pressure piston and the other opened during the next, and upon each return movement of the low pressure piston its exhaust valve 22 is opened and the spent gases are fully discharged through the exhaust pipe 191, this return action of the piston being effected by the gases exhausted from the high pressure cylinders at the other ends. The momentum of the fly wheel and engine parts generally operates as usual as in engines of this class. Thus it will be seen that although the high pressure cylinders all operate upon the four cycle plan, yet each stroke of the high pressure cross head in each direction constitutes a true power stroke deriving its force from first one and then the other of the high pressure pistons upon successive strokes. Every stroke in each direction from the low pressure piston is also a power stroke, the pressures upon each stroke from a given end being supplied alternately from the high pressure cylinders at this end, all of this being brought about through the proper relative arrangement of the parts in connection with the two high-pressure cylinders.

One method of scavenging the cylinders is secured by arranging the cams of the air inlet valves of the high-pressure cylinder so as to give a slight lead to the air entrance ahead of the mixture with the gas. Upon closing these valves, this lead should be reversed, the gas valve closing a trifle ahead of the air valve, whereby that portion of the casing above the air or admission valve is swept clear of gas and thereby no gas will mix with the air which stands in this reservoir ready to be admitted upon the next opening of the air valve, and thus air unmixed with gas is secured for scavenging.

As before pointed out, the clearance spaces of the high pressure or combustion cylinder operating under this system are very large and it therefore becomes necessary under certain conditions of operation that they be cleared of all inert gases or products prior to the introduction of the next charge, especially so on account of the extra amount of oxygen thus rendered available for combustion purposes, which would be otherwise displaced. By opening the air valve near the termination of the exhaust stroke the inert gases are swept out of the combustion cylinder and into the low pressure cylinder. This will fill the clearance space of the combustion cylinder with air which is desirable. The gas valve is opened subsequently and the gas mixes with the air in the clearance space and from the supply to form the charge. It will be seen that in the construction shown, the inert gases are swept on into the low-pressure cylinder and whatever pressure they retain is fully utilized therein. It is not intended or necessary that the displacement air or any considerable quantity thereof should enter the low-pressure cylinder and the displacement or scavenging operation is preferably gaged and adjusted to this end.

Under this system of operation, there is a pre-compression of the air and another of the vaporized fuel or gas at any suitable pre-compression pressure to the inhalation stroke of the four-cycle operation and it will be seen that the relative pressures may be equalized or varied and maintained as desired.

There are other advantages, among which may be cited the return as mechanical energy of a portion of the energy required in pre-compression, and the distribution of the shock and strains incident to and present within the combustion engine in such a manner that while the high pressures exist they are confined to the high-pressure cylinders and compelled to do their work upon the smaller pistons, and when their pressure has fallen sufficiently their energy is utilized upon a piston of very large area. Again, by the arrangement of the group of cylinders described, the wall areas for dissipation of heat are much less for given cubical contents than in a simple engine, and the heat ranges best suited to the pressures are localized in each cylinder. For instance, it has been found practicable to run the low-pressure cylinder without water jackets, whereby the walls are all maintained at a medium high yet practicable temperature, and an available and advantageous regenerative and heat sustaining function is thus secured in this cylinder, especially effective in the latter part of the working stroke.

Figure 5:
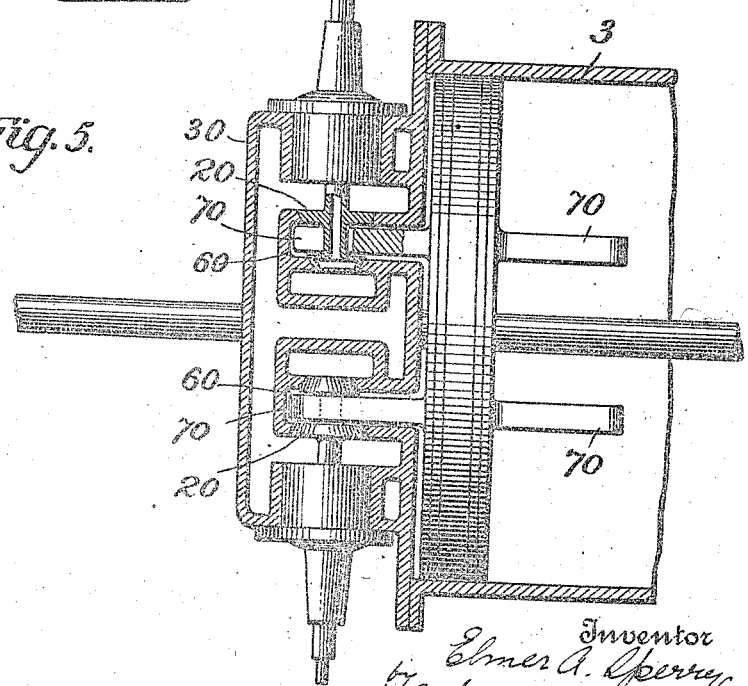
Fig. 5 is an enlarged section on line 5—5, Fig. 2, looking in the direction of the arrow.

It will be seen that each end of each of the high pressure cylinders constitutes in connection with the chamber 90 practically a combustion chamber and as this is the hottest part of the structure, the valve casing 130 is preferably provided with a chamber $x$ through which water may be conducted. This cooling means is also adopted in the case of the double seated valves 20, Fig. 5, whereby the expansion of the connecting hollow stem is kept practically uniform with that of the walls of the valve casing, thus maintaining a constant relation between the seats and valves proper as the temperatures change.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a compound four-cycle internal combustion engine having prior to combustion an inhalation and a compression stroke within the combustion cylinder, means for utilizing the further expansion of the gases after the normal combustion or working stroke, means for compressing the air, a separate means for compressing the fuel prior to introduction into the said combustion cylinder, an air valve opening into the combustion cylinder, a separate fuel valve, and means for operating the valves in succession with the air valve leading the fuel valve in opening, as and for the purpose specified.

2. In a compound four-cycle internal combustion engine having prior to combustion an inhalation and a compression stroke within the combustion cylinder, means for utilizing the further expansion of the gases after the normal combustion or working stroke, means for compressing the air, a separate means for compressing the fuel prior to introduction into the said combustion cylinder, an air valve opening into the combustion cylinder, a fuel valve opening to the air valve, and means for opening the air valve previous to and closing it after the opening and closing of the fuel valve, for the purpose specified.

3. In a four-cycle, compound internal combustion engine, in combination, a low pressure cylinder, a pair of double acting high pressure cylinders operatively connected with the low pressure cylinder by suitable passages, pistons for said cylinders, a common crank shaft having a crank connected with the low pressure piston, and a second crank connected to both of the high pressure pistons, and valves for said cylinders timed so that the high pressure cylinders will alternately exhaust into the low pressure cylinder at the termination of the power stroke of the respective high pressure pistons.

4. In a four-cycle compound internal combustion engine, in combination, a low pressure cylinder, a pair of double acting high pressure cylinders located one above the other and side by side and operatively connected with the low pressure cylinder by suitable passages, pistons for said cylinders, a crank shaft having a crank connected with the low pressure piston, a common cross head for the high pressure pistons, a second crank on the crank shaft connected with the cross head and displaced 180° from the first crank, and valves for said cylinders timed so that the high pressure cylinders will alternately exhaust into the low pressure cylinder.

5. In a four-cycle compound internal combustion engine, in combination, a double acting low pressure cylinder, a pair of double acting high pressure cylinders operatively connected with the low pressure cylinder by suitable passages, pistons for said cylinders, a common crank shaft having cranks connected to the pistons, air, fuel and exhaust valves for the high pressure cylinders, exhaust valves for the low pressure cylinder, means for supplying air and fuel under pressure to the high pressure cylinders, means for opening the air valves during the exhaust of the high pressure cylinders, and means for opening alternately the high pressure cylinder exhaust valves which control the passage of the exhaust to the same end of the low pressure cylinder.

6. In a four-cycle compound internal combustion engine, in combination, a low pressure cylinder, a pair of high pressure cylinders located one above the other and side by side and operatively connected with the low pressure cylinder by suitable passages, pistons for said cylinders, a crank shaft having a crank connected with the low pressure piston, a common cross head for the high pressure pistons, a crank on the crank shaft connected with the cross head and displaced 180° from the first crank, air and fuel inlet and exhaust valves for the high pressure cylinders, an exhaust valve for the low pressure cylinder, means for supplying air and fuel under pressure to the high pressure cylinders, means for opening the air valves during the exhaust of the high pressure cylinders, and means for opening the exhaust valves of the high pressure cylinders alternately.

7. In a four-cycle compound internal combustion engine, in combination, a low pressure cylinder, a pair of double acting high pressure cylinders located one above the other, side by side, and adjacent to and operatively connected with the low pressure cylinder by suitable passages, pistons for said cylinders, a common crank shaft having a crank connected with the low pressure pistons, and a second crank connected to both of the high pressure pistons, and valves for said cylinders timed so that the high pressure cylinders will alternately begin to exhaust into the low pressure cylinder at the terminations of the power strokes of the respective high pressure pistons.

8. In a four-cycle compound combustion engine, the combination of a high pressure or combustion cylinder, a low pressure or expansion cylinder, the expansion cylinder having a clearance space of minimum capacity and the combustion cylinder having a combustion chamber of such large capacity that the pressure therein will exceed atmospheric pressure at the end of the power stroke of the high pressure piston, a valve and means for operating the same to admit gas during the inhalation stroke of the high pressure piston, a second valve and means for opening the same in advance of the gas valve to admit air to scavenge the combustion chamber, said means being operative to hold the air valve open while the gas valve is open and for a period thereafter, and means for admitting the gases from the high pressure cylinder to the low pressure cylinder once during each cycle of operations.

9. In a four-cycle combustion engine, the combination with a cylinder and piston, of means for admitting fuel to the cylinder during the inhalation stroke of the piston, a source of air under pressure, and means for admitting such air to the combustion chamber during the latter part of the exhaust stroke to scavenge the combustion chamber and also during the inhalation stroke to mix with the fuel.

10. In a four-cycle combustion engine, the combination with the cylinder and piston, of means for admitting fuel to the cylinder, a source of air under pressure, means for admitting such air to the combustion chamber before and after the admission of fuel for the purpose of scavenging the combustion chamber and augmenting the charge therein, respectively, a low pressure or expansion cylinder, and means for admitting the gases from the high pressure cylinder to the low pressure cylinder once during each cycle of operations of the high pressure cylinder.

11. In a compound four-cycle combustion engine having prior to combustion an inhalation and compression stroke within the combustion cylinder, a high pressure or combustion cylinder, a low pressure cylinder of larger displacement than the combustion cylinder receiving the hot gases after the normal working stroke within the combustion cylinder, said combustion cylinder having a large clearance space of sufficient capacity for supplying pressure gases for both cylinders, means for introducing the constituents of the explosive charge into said combustion cylinder, and means for separately compressing each constituent thereof to a pressure above the atmosphere prior to its delivery to the combustion cylinder.

12. In a four-cycle compound combustion engine, the combination of a high pressure or combustion cylinder, a coupled low pressure or expansion cylinder, the expansion cylinder having a clearance space of small capacity and the combustion cylinder having a combustion space or chamber of relatively large capacity, the combustion chamber having a lateral extension overlapping the end of the low pressure cylinder and provided with a valved outlet leading directly into said cylinder whereby dead space between the two is avoided and the gases from the combustion chamber may pass to the low pressure cylinder without diminution in efficiency.

13. In a four-cycle compound combustion engine, the combination of two high pressure or combustion cylinders, a low pressure cylinder arranged adjacent to each of said high pressure cylinders, combustion chambers for the high pressure cylinders having laterally extending portions overlapping an end of the low pressure cylinder, and valved openings between said combustion chambers and the end of the low pressure cylinder, whereby a direct transference of the gases from said combustion chambers to the low pressure cylinder without diminution in efficiency is effected.

14. In an internal combustion engine, in combination, a cylinder, a piston working therein, air and fuel inlet valves, independent means for supplying the air and fuel under different pressures, and a common means for controlling the relative pressures of the air and fuel.

15. A four-cycle compound internal combustion engine comprising, in combination, a low pressure cylinder, a pair of high pressure double acting cylinders operatively connected with the low pressure cylinder by suitable passages, valve means controlling the transfer of gases through said passages from the high pressure cylinders to the low pressure cylinder, pistons arranged to work in said cylinders, an engine shaft, cranks on said shaft connected to said pistons, the high pressure and low pressure cranks being set substantially 180 degrees apart, and admission means for supplying air and fuel to each high pressure cylinder on both sides of its piston, the operation of said admission means and of the transfer-controlling valve means being so timed and correlated that the high pressure cylinders exhaust alternately into the low pressure cylinder 16. A four-cycle compound internal combustion engine comprising, in combination, a low pressure cylinder, a pair of high pressure double acting cylinders operatively connected with the low pressure cylinder by suitable passages, valve means controlling the transfer of gases through said passages from the high pressure cylinders to the low pressure cylinder, pistons arranged to work in said cylinders, an engine shaft, cranks on said shaft connected to said pistons, the high pressure and low pressure cranks being set substantially 180 degrees apart, admission valves arranged to deliver air and fuel near each end of each high pressure cylinder, means controlling said valves and timed to give four-cycle double acting operation of said high pressure cylinders, said high pressure cylinders being arranged to exhaust alternately into the low pressure cylinder through the connecting passages, and the transfer-controlling valve means being arranged to maintain free communication between each high pressure cylinder and the proper end of the low pressure cylinder substantially throughout an exhaust stroke in such high pressure cylinder.

17. In a compound combustion engine, the combination of high pressure and low pressure cylinders and pistons, a transfer valve between said cylinders located at the end of the low pressure cylinder, and a plug on said low pressure cylinder adapted to enter the transfer valve opening, whereby the clearance in said piston is reduced to a minimum.

18. In a compound combustion engine, the combination of high pressure and low pressure cylinders and pistons, a double seated transfer valve between said cylinders and located at the end of the low pressure cylinder, and a forked plug on said low pressure cylinder adapted to enter the transfer valve opening and straddle the stem between the valve seats, whereby the clearance in said piston is reduced to a minimum.

19. In a compound combustion engine, the combination with coupled high and low pressure cylinders and pistons, of a source of air under pressure, an intake valve for the air to the high pressure cylinder, a transfer valve between said cylinders, and means for opening the intake valve during the latter part of the exhaust stroke of the high pressure piston and while the transfer valve is open, whereby all of the products of combustion in both the high pressure cylinder and said chamber are swept into the low pressure cylinder.

20. In a compound combustion engine, the combination with coupled high and low pressure cylinders and pistons, of an elongated compression chamber connecting the ends of the two cylinders, a source of air under pressure, an air intake valve adjacent the high pressure end and a transfer valve adjacent the low pressure end of said chamber and means for opening the said intake valve near the end of the exhaust stroke of the high pressure piston and while the transfer valve is open, whereby scavenging air sweeps through said high pressure cylinder and compression chamber and into said low pressure cylinder.

21. In a compound combustion engine, the combination with coupled high and low pressure cylinders and pistons, of an elongated compression chamber connecting the ends of the two cylinders, a source of air under pressure, air and fuel intake valves adjacent the high pressure end and a transfer valve adjacent the low pressure end of said chamber and means for opening said air valve near the end of the exhaust stroke of the high pressure piston and while the transfer valve is open, whereby scavenging air sweeps through said high pressure cylinder and compression chamber and into said low pressure cylinder.

22. In a compound combustion engine, the combination with coupled high and low pressure cylinders and pistons, of an elongated compression chamber connecting the ends of the two cylinders, a source of air under pressure, air and fuel intake valves adjacent the high pressure end and a transfer valve adjacent the low pressure end of said chamber and means for opening said air valve prior to and closing it after the fuel valve, the opening occurring during the latter part of the exhaust stroke of the high pressure piston and while the transfer valve is open, whereby complete scavenging is effected.

23. In a compound combustion engine, the combination with coupled high and low pressure cylinders with their pistons, of an elongated compression chamber connecting the ends of the two cylinders, opening directly in said high pressure cylinder, an intake valve adjacent said high pressure end of said chamber and a transfer valve connecting said chamber and said low pressure cylinder, whereby a large clearance is provided for the high and a small clearance for the low pressure cylinder.

24. In a compound combustion engine, the combination with coupled high and low pressure cylinders with their pistons, of an elongated compression chamber connecting the ends of the two cylinders, opening directly in said high pressure cylinder, an intake valve adjacent said high pressure end of said chamber, a transfer valve connecting said chamber and said low pressure cylinder, and a projection on the low pressure piston adapted to enter the opening in the cylinder head formed by the passage to said transfer valve, whereby a large clearance is provided for the high and a small clearance for the low pressure cylinder.

25. In a four-cycle combustion engine, the combination with the cylinder and piston, of means for admitting fuel to the cylinder during the inhalation stroke of the piston, a source of air under pressure, means for admitting such air to the combustion chamber before and after the admission of fuel for the purpose of scavenging the combustion chamber and augmenting the charge therein, respectively, a low pressure or expansion cylinder, and means for admitting the gases from the high pressure cylinder to the low pressure cylinder during the exhaust stroke of the high pressure cylinder, while the air is being admitted and prior to the admission of the fuel.

26. In a four-cycle compound combustion engine, the combination of two high pressure or combustion cylinders, a low pressure cylinder arranged adjacent both of said high pressure cylinders, combustion chambers for the high pressure cylinders having laterally extending portions overlapping an end of the low pressure cylinder, valved openings between said combustion chambers and the end of the low pressure cylinder, and projections on the low pressure piston adapted to enter said openings to reduce clearances, whereby a direct transference of the gases from said combustion chambers to the low pressure cylinder without diminution in efficiency is effected.

27. In an internal combustion engine, in combination, a cylinder, a piston working therein, air and fuel inlet valves, independent means for supplying the air and fuel under different pressures, and means for controlling the relative pressures of the air and fuel comprising a storage tank for each fluid and a pressure equalizing connection between said tanks, adapted to maintain the pressure of said fluids at any predetermined ratio.

28. In an internal combustion engine, the combination with a cylinder, a piston working therein, air and fuel inlet valves, of means for supplying at least one of the fluids under variable pressure comprising a variable duty compressor and automatic means responsive to the engine's speed for governing the degree of compression consisting in varying the clearances.

29. In an internal combustion engine, the combination with a cylinder and piston working therein, air and fuel inlet valves, of means for supplying at least one of the valves under variable pressure comprising a variable duty compressor and automatic means responsive to the engine's speed for governing the degree of compression.

30. In an internal combustion engine, in combination, a cylinder, a piston working therein, air and fuel inlet valves, independent means for supplying the air and fuel under different pressures, and means for equalizing the pressures between said independent means, on a basis of predetermined ratios.

31. In an internal combustion engine, in combination, a cylinder, a piston working therein, air and fuel inlet valves, independent means for supplying the air and fuel under different pressures, and means for equalizing the pressures between said independent means on a basis of predetermined ratios and means whereby said ratios may be varied at will.

32. In an internal combustion engine, in combination, a cylinder, a piston working therein, air and fuel inlet valves, independent means for governing the fuel consumption of the engine, comprising a compressor for supplying the fuel under pressure, and automatic means controlled by the engine speed for varying the operative clearance of said compressor.

33. In an internal combustion engine, in combination, a cylinder, a piston working therein, air and fuel inlet valves, a common means for compressing without mixing both the air and fuel, a common means for controlling the relative pressures of the air and fuel, and independent means for supplying said air valve and said fuel valve with its respective fluid.

34. In an internal combustion engine, the combination with a cylinder and piston working therein, air and fuel inlet valves, of means for supplying at least one of the valves under variable pressure comprising a variable duty compressor and automatic means responsive to the engine's speed for governing the degree of compression, and for governing the lead of the spark.

35. In an internal combustion engine, the combination with a cylinder, a piston working therein and air and fuel inlet valves, of means for governing the fuel consumption of the engine comprising a compressor for supplying at least one of the combustion fluids under pressure and a common means for governing the degree of compression and the opening of at least one of said valves.

36. In an internal combustion engine, the combination with a cylinder, a piston working therein and air and fuel inlet valves, of means for governing the fuel consumption of the engine, comprising two compressors for supplying the air and fuel independently and under pressure, means for governing the degree of compression of both fluids, and means working in synchronism with said other governing means for governing the opening of said valves.

37. In an internal combustion engine, the combination with a cylinder, a piston working therein and air and fuel inlet valves, of means for governing the fuel consumption of the engine, comprising two compressors for supplying air and fuel independently and under pressure, means for equalizing the pressure of said air and fuel, means for governing the degree of compression of both fluids, and means working in synchronism with said other governing means for governing the opening of said valves.

38. In a combustion engine, the combination with a cylinder, a piston working therein, a fuel supply valve and an electric ignition system, of means for supplying the fuel under pressure, and governing means responsive to the engine speed for controlling the degree of compression, the opening of the valve and the lead of the spark.

In testimony whereof I have signed my name to this specification in the presence of two subscribing witnesses.

ELMER A. SPERRY.

Witnesses:
F. B. KRAUSE,
GEO. C. JOHNSON.